UNITED STATES PATENT OFFICE.

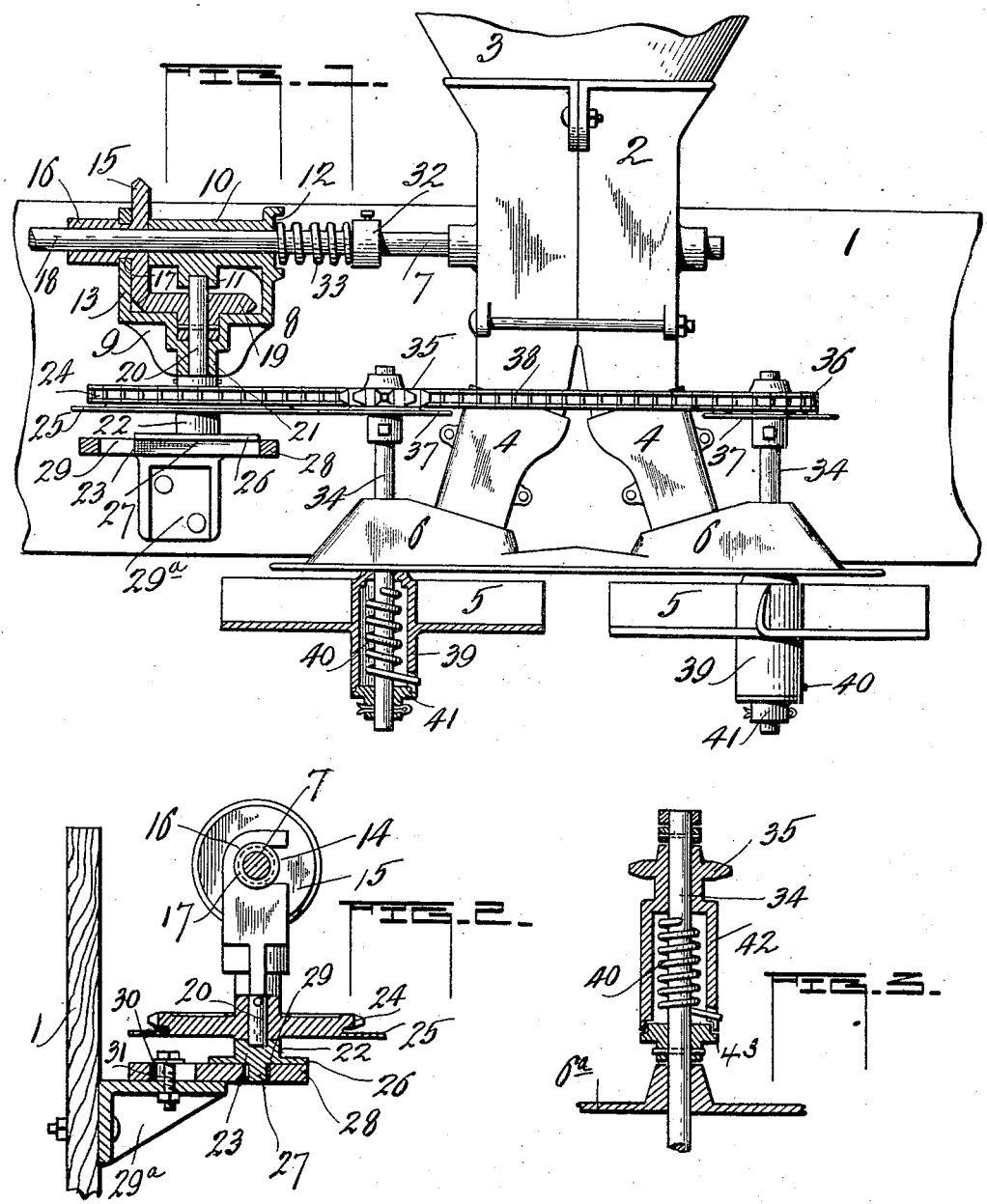

WILLIAM G. BOLUS, OF PEORIA, ILLINOIS.

SEEDING DEVICE.

No. 870,488.  Specification of Letters Patent.  Patented Nov. 5, 1907.

Application filed February 8, 1906. Serial No. 300,162.

To all whom it may concern:

Be it known that I, WILLIAM G. BOLUS, a citizen of the United States, residing at Peoria, in the county of Peoria and State of Illinois, have invented certain new and useful Improvements in Seeding Devices; and I do hereby declare that the following is a full, clear, and exact description of the invention, which will enable others skilled in the art to which it appertains to make and use the same.
This invention has reference to certain new and useful improvements in seeding devices and relates particularly to the broadcast or end-gate variety.

One of the objects of the present invention is the combination with the driving shaft of a broad-cast distributing device or similar machine, of fan-shafts and driving connections between the fan shafts and the driving shaft aforesaid and fans carried upon the lower ends of the fan shafts, the same being connected thereto through the medium of a coil spring, preferably disposed in the hub of the fan with one end of said spring secured to the fan shaft and the opposite end thereof secured to the hub of the fan; such a connection between the fan and its shaft forming a resilient connection and not only relieves the same of the jerking motion present in the connection of fans with similar devices but enables me to distribute the material discharged by the fans at a greater distance than may be obtained in similar machines.

The invention has for its further object, the combination with seeding devices and distributers therefor, of a driving shaft for imparting motion to said seeding devices and distributers and to suitable resilient and compensating driving devices on the said driving shaft having connection with said distributers.
For a further and full description of the invention herein and the merits thereof, and also to acquire a knowledge of the details of construction of the means for effecting the result, reference is had to the following description and the drawings hereto attached.
While the essential and characteristic features of the invention are susceptible of modification, still the preferred embodiment of the invention is illustrated in the accompanying drawings, in which:—

Figure 1 is a front elevation of a broad cast distributing machine showing my improvements attached thereto, parts of the mechanism thereof being in cross section; Fig. 2 is an end view partly in section of the driving connections with the driving shaft and the manner of supporting the same from an end-gate, and Fig. 3 is a detail in vertical section of a modified connection of the driving connections with the driven shaft or shafts.

Like numerals of reference indicate corresponding parts throughout the figures.

In the drawings 1 denotes an end-gate to which may be attached suitable seeding devices consisting of the casing 2 supporting the hopper 3 and leading from the casing are suitable diverging feed ways or spouts 4 communicating with distributers or fans 5 through an overlying feed way 6. The casing 2 is adapted to contain suitable force feed or other seeding mechanism, not shown, which is adapted to be driven by means of a driving shaft 7 deriving its power from some suitable source, as from the ground wheel of a vehicle or by other suitable means.

On the driving shaft 7 and spaced at a suitable distance from the casing 2 I have connected a compensated driving mechanism indicated as a whole as 8. Said compensating mechanism consists of a bracket 9 swingably and slidably carried on the shaft 7; the same provided with a longitudinal sleeve portion 10 from which depends a short tubular bearing or stud 11. The outer face of the bracket 8 co-inciding with the outer tubular portion 10 thereof I have provided with the annular depression or seat portion 12 for a purpose to be described. The wall of the bracket opposite to that with which the outer end of the sleeve 10 connects is indicated as 13 and at its upper end is provided with a laterally disposed slot or groove 14 in which is adapted to be seated and have bearing a reduced sleeve or hub portion of a gear to be described. There is provided intermediate the inner face of the wall 13 of the bracket 9 and one end of the sleeve 10 sufficient space for the interposition of a gear 15 which is revolubly connected with the driving shaft 7; this gear has an elongated hub 16 provided with the annular groove 17 adjacent to the outer face of the gear 15. It is adapted to connect the gear 15 with the driving shaft 7 for rotating with the said drive shaft when power is imparted thereto and to do this I employ the usual spline and groove connection between the hub of the said wheel and the driving shaft 7, the groove in the shaft being indicated as 18 and is of sufficient length to adapt the bracket 9 and the gear 15 to be projected longitudinally on the shaft 7. Meshing with the gear 15 is seen a gear wheel 19 which is suitably carried on a short vertical shaft 20 which has its upper end journaled in the bearing or stud 11 of the bracket 9 and the hub of the gear 19 as well as the shaft 20 is carried through a short vertical bearing 21 depending from the body of the bracket 9 and the extreme lower end of the said shaft is journaled in a short tubular bearing 22 projecting upwardly from a slidably supported block or bearing plate 23. Also carried by the shaft 20 intermediate the lower end of the bracket 9 and the block 23 is shown a sprocket wheel 24 having the annular flange 25 somewhat larger in diameter than the sprocket wheel 24 as shown.

Referring to the block or bearing plate 23 the same is provided with the lateral flanges 26 which are substantially the length of the block and 27 denotes a depending and elongated web disposed centrally of the block 23. The block or bearing plate 23 is supported by an adjustable plate 28 provided with an elongated slot 29 in which is carried and has movement the depending web 27 of the block 23, the flanges 26 in the said block engaging and having movement upon the plate 28. The plate 28 is in turn adjustably connected with a bracket or support 29ª which is secured in a certain position on the end-gate 1. To adapt the adjustment of the plate 28 on the bracket 29ª I provide the plate with a slot 30 through which is carried a bolt 31 for fixing the position of the plate 28 on the bracket 29ª.

On the shaft 7 heretofore referred to as the driving shaft, I provide a collar 32 between which and the annular depression or seat portion 12 of the bracket 9 is interposed a coil spring 33, somewhat as seen in Fig. 1.

At a suitable point on the outside of the feed ways 4 and extending through the shield 6 are journaled a pair of vertical fan shafts indicated as 34, on the lower ends of which are suitably carried the fans or distributers heretofore indicated as 5 and on the upper ends of the fan shafts are carried the sprocket pinions 35 and 36 provided with the flanges 37 in diameter larger than the said pinions 35 and 36. These sprocket pinions are in horizontal alinement with the sprocket wheel 24 and a driving chain or endless belting indicated as 38 has engagement with the sprocket wheel 24 and the pinions 35 and 36, the office of the flange 25 of the sprocket wheel 24 and the flanges 37 of the pinions are to form a guard for the driving chain. While I have shown the sprocket wheels, pinions and driving chain as that form of sprocket wheel and pinions adapted for use in connection with the usual malleable link belting, however, I do not limit myself to the use of such elements in a drive as the driving chain may be one employing transverse links commonly known as a jack-chain or it may be found convenient to use a belt or cable and in either event the driving and driven wheels may be such as are used in connection with the form of chain or belt employed.

The compensating mechanism which comprises the bracket 9 and the parts therewith or the component parts thereof serves to relieve the driving chain, gears and other operative parts from all jars and jerking motions caused through any uneven drive of the driving shaft or the sudden starting or stopping of the said driving shaft. The tension of the driving chain is adjusted through the longitudinal adjustment of the bracket 9 and its component parts on the driving shaft, the slotting of the bracket plate 28 adapting longitudinal movement of the bearing plate 23 when the bracket 9 is so adjusted and the bracket 9 is yieldingly held in its adjusted position by means of the collar 32 on the driving shaft and the spring 33 on the said shaft bearing between the collar and the annular depression or seat portion of the bracket, as described. Thus it will be seen that there may be a slight motion of the bracket 9 on the driving shaft which in turn gives a resilient connection of the driving chain between the driving and driven sprocket wheels. In applying this form of drive to the different forms of broadcast distributers it may be necessary to employ a guiding sheave wheel or some other form of idler around which the chain or cable is directed; the aim of which, would be to prevent the chain or cable from engaging with parts of the machine or to insure its proper contact with the driving or driven wheels. However, in the present device such a guide has been omitted.

The provision made for the adjustment of the bearing plate 28 on the bracket 29ª is to provide for the irregularity of construction and assemblage of parts in machines of this character and to properly aline the driving wheel with the driven wheel or wheels.

I will now describe the resilient connection between the fans and their shafts, to which reference has been made and in said description I will refer to two different forms of resilient connections between the fan shafts, their driving pinions and fan or distributers. In the preferred construction, the fans are each provided with enlarged tubular hub portions indicated as 39 which depend a suitable distance below the bottoms of the fans to provide a proper bearing and for the connection of a spring which should be of suitable length to have sufficient strength to perform the work it is required to do. The spring is indicated as 40 and is coiled about the fan shaft within the hub of the fan and at one end is attached to the said shaft and at its opposite end connected, preferably, with the hub of the fan. The bore of the hub of the fans are aimed to be in diameter larger than the diameter of the coil spring which enables the spring to relax after an operation of the fan without grinding against the inner wall of the hubs thereof, the result of which would have a tendency to snap or break the spring. The introduction of the spring such as shown in the drawings or similar thereto, in connection with the fan shafts of a broad cast distributer will serve to relieve all jerking movements present in devices of this character, where the fans have a rigid connection with the shafts and where the operation of the fan shafts is uneven caused by the sudden starting or stopping of the mechanism or the travel of such machines over uneven soil and through the resiliency of such a connection between the fan shaft, its gear and fan I can obtain a further sweep of the material received and discharged by the fans or distributers rotating on such fan shafts. For the open lower ends of the hubs I employ the bearing plates 41 having suitable hub portions whereby the bearing plates may be secured to the shafts to form a closure for the lower open ends of the said hubs, by means of cotter pins or some other suitable device.

In Fig. 3 I have shown a modified resilient connection between the fan shaft, the gear and fan thereof. The difference between what is shown in Fig. 3 and the construction in Fig. 1 is that the spring on the fan shaft is connected with the shaft and the fan; in Fig. 3 the spring 40 is connected with the shaft and with an enlarged tubular hub portion 42 depending from and preferably integral with the pinion 35, and said hub portion is in all respects similar to that indicated as 39 of the fan or distributer 5 and for the lower open end of the hub 42 I provide a bearing plate 43 secured in a suitable manner to the shaft. With the construction shown in Fig. 3 the shaft may pass up through the overlying feed way 6, as shown in Fig. 1 or simply a covering plate indicated as 6ª in Fig. 3. While the same result is accomplished with the construction shown in Fig. 3 as would be accomplished with the construction similar to that shown in Fig. 1, yet, the application of the devices shown in Fig. 3 may be applied to driven shafts not coupled with seeding devices where it is desired to relieve the driven shaft from a jerking movement or unevenness caused by sudden starting or stopping of the same.

Having thus fully described my invention, what I claim and desire to secure by Letters Patent of the United States, is:—

1. In a device of the character described, the combination of a horizontal driving shaft, driven shafts, distributers carried by said shafts, a compensating drive on the driving shaft, connections between said drive and the driven shaft or shafts, and a resilient connection between the said fans and their shafts.

2. In a device of the character described, the combination of a shaft, a distributer carried thereby, and a resilient connection between the distributer and said shaft.

3. In a device of the character described, the combination of a shaft, a distributer carried thereby, and a coil spring connection between the distributer and the shaft, said spring being connected at one end to the shaft and its opposite end to the distributer.

4. In a device of the character described, the combination of a shaft, a distributer carried thereby and having an enlarged tubular hub, and a coil spring carried on said shaft within the hub of the distributer, one end thereof connected to the shaft and the opposite end connected to the distributer.

5. In a device of the character described, the combination with seeding devices, distributers adapted to operate in unison therewith, means for actuating the seeding devices, a driven shaft in connection with said actuating means and supporting said distributer, and a resilient connection between the distributer and its shafts.

6. In a device of the character described, the combination with a shaft, of a driven wheel carried on one end thereof, a distributer carried on the opposite end, and a resilient connection on said shaft between the driven wheel and the distributer.

7. In a device of the character described, the combination with seeding devices, means for actuating the same, a driven shaft adapted to operate in unison with said seeding devices, a driven pinion on one end of said shaft and in connection with said actuating means, a distributer on the opposite end of said shaft, and a resilient connection on said shaft between the pinion thereof and the distributer.

8. In a device of the character described, the combination of a horizontal driving shaft, a plurality of driven shafts, driven pinions carried on one end of said driven shafts and supporting distributers at their opposite ends, a compensating drive on the driving shaft, connections between said drive and the pinions on the driven shafts, and a resilient connection on said driven shafts between the pinions thereof and the said distributers.

9. In a device of the character described, the combination with a casing for supporting suitable seeding devices, a feed way depending from said casing, a distributer rotatably supported beneath the discharge end of the feed way, a shaft for supporting the distributer, means for actuating said shaft, and a resilient connection between said shaft and the distributer.

In testimony whereof I affix my signature, in presence of two witnesses.

WILLIAM G. BOLUS.

Witnesses:
CHAS. W. LA PORTE,
ROBERT N. MCCORMICK.